US012230913B2

(12) United States Patent
Enomoto et al.

(10) Patent No.: US 12,230,913 B2
(45) Date of Patent: Feb. 18, 2025

(54) CONNECTOR CONNECTION STRUCTURE

(71) Applicant: Nippon Tanshi Co., Ltd., Hiratsuka (JP)

(72) Inventors: Shinya Enomoto, Kanagawa (JP); Osamu Nishimura, Kanagawa (JP); Masaru Fujino, Kanagawa (JP); Fumiaki Arimai, Tokyo (JP); Hiroyoshi Nishizaki, Tokyo (JP)

(73) Assignee: Nippon Tanshi Co., Ltd., Hiratsuka (JP)

( * ) Notice: Subject to any disclaimer, the term of this patent is extended or adjusted under 35 U.S.C. 154(b) by 388 days.

(21) Appl. No.: 17/773,986

(22) PCT Filed: Oct. 8, 2020

(86) PCT No.: PCT/JP2020/038152
§ 371 (c)(1),
(2) Date: May 3, 2022

(87) PCT Pub. No.: WO2021/090633
PCT Pub. Date: May 14, 2021

(65) Prior Publication Data

US 2022/0393391 A1 Dec. 8, 2022

(30) Foreign Application Priority Data

Nov. 6, 2019 (JP) ................................ 2019-201170

(51) Int. Cl.
*H01R 13/52* (2006.01)
*H01R 13/621* (2006.01)
*H01R 31/06* (2006.01)

(52) U.S. Cl.
CPC ..... *H01R 13/5219* (2013.01); *H01R 13/5202* (2013.01); *H01R 31/06* (2013.01); *H01R 13/5216* (2013.01); *H01R 13/6215* (2013.01)

(58) Field of Classification Search
CPC ....................... H01R 13/5219; H01R 13/5202; H01R 13/74; H01R 31/06; H01R 33/00; H01R 13/5216; H01R 13/6215
(Continued)

(56) References Cited

U.S. PATENT DOCUMENTS 5,284,448 A * 2/1994 Hussmann ........... H05K 5/0069 439/550
7,341,484 B2 * 3/2008 Yamamoto ......... H01R 13/5202 439/271

(Continued)

FOREIGN PATENT DOCUMENTS

JP 2000230642 8/2000
JP 2017143287 8/2017

OTHER PUBLICATIONS

PCT International Search Report for corresponding PCT Application No. PCT/JP2020/038152, mailed Nov. 24, 2020, 5 pages.

*Primary Examiner* — Gary F Paumen
(74) *Attorney, Agent, or Firm* — Dority & Manning, P.A.

(57) ABSTRACT

To allow an electronic control unit to be replaced with good work efficiency and prevent foreign matter from entering a casing during maintenance work, the connector connection structure includes an internal connector positioned inside a casing, an external connector positioned outside the casing and an electronic control unit electrically connected between the external connector and the electronic control unit wherein the electronic control unit includes a main part that opposes an opening formed in the casing when the internal connector is connected thereto, and a first conductive connection portion and a second conductive connection portion provided on either end of the main part and configured to be connected to the internal connector and the external connector respectively, and a first seal member is provided on an outer periphery of the main part, the first seal member
(Continued)

closing the opening when the external connector is not connected to the electronic control unit and the internal connector is connected to the electronic control unit.

7 Claims, 6 Drawing Sheets

(58) Field of Classification Search
USPC ......................... 439/278, 271, 272, 548, 556
See application file for complete search history.

(56) References Cited

U.S. PATENT DOCUMENTS

| | | | | |
|---|---|---|---|---|
| 8,248,800 | B2 * | 8/2012 | Takata | F16H 61/0006 165/80.4 |
| 2011/0228478 | A1 | 9/2011 | Takata et al. | |
| 2012/0282789 | A1 | 11/2012 | Kawamura | |
| 2019/0386422 | A1 * | 12/2019 | Takahashi | H01R 13/521 |
| 2020/0235366 | A1 | 7/2020 | Haino et al. | |

* cited by examiner

CONNECTOR CONNECTION STRUCTURE

CROSS REFERENCE TO RELATED APPLICATIONS

This application is the U.S. National Stage entry of International Application No. PCT/JP2020/038152 filed under the Patent Cooperation Treaty on Oct. 8, 2020, which claims priority to Japanese Patent Application No. 2019-201170 filed on Nov. 6, 2019, both of which are incorporated herein by reference.

TECHNICAL FIELD

The present invention relates to a connector connection structure, and more particularly to a connector connection structure wherein an electronic control unit is connected to an internal connector positioned inside a casing and an external connector positioned outside the casing.

BACKGROUND ART

In a known electronic control device, a casing accommodating an electronic control unit is directly connected to a control object device such an electric motor, and an electric connector for external connection is mounted to the casing.

PRIOR ART DOCUMENT(S)

Patent Document(s)

Patent Document 1: JP2017-143287A

SUMMARY OF THE INVENTION

Task to be Accomplished by the Invention

In such a conventional electronic control device, when it becomes necessary to replace the electronic control unit due to a malfunction or the like, it is necessary to disassemble the entire device. Thus, the conventional electronic control device lacks maintainability. Further, no provision is made to prevent foreign matter from entering the casing when taken apart during maintenance work.

In view of such a problem of the prior art, a primary object of the present invention is to allow the electronic control unit to be replaced with good work efficiency and to prevent foreign matter from entering the casing during maintenance work.

Means to Accomplish the Task

To achieve such an object, a certain aspect of the present invention provides a connector connection structure including an internal connector (20) positioned inside a casing (10), an external connector (30) positioned outside the casing (10), and an electronic control unit (50) electrically connected between the external connector (30) and the electronic control unit (50), wherein the electronic control unit (50) includes a main part (54) that opposes an opening (16) formed in the casing (10) when the internal connector (20) is connected thereto, and a first conductive connection portion (56) and a second conductive connection portion (58) provided on either end of the main part (54) and configured to be connected to the internal connector (20) and the external connector (30), respectively, and a first seal member (70) is provided on an outer periphery of the main part, the first seal member closing the opening (16) when the external connector (30) is not connected to the electronic control unit (50), and the internal connectors (20) is connected to the electronic control unit (50).

Since the electronic control unit (50) can be removed from the internal connector (20), the electronic control unit (50) can be replaced in an efficient manner, and when the external connector (3) is removed for maintenance purposes, the first seal member (70) prevents foreign matter from entering the casing (10).

In this connector connection structure, preferably, the first seal member (70) is configured to abut against an inner peripheral surface of the opening (16) so as to provide a seal between the casing (10) and the electronic control unit (50) when the external connector (30) is not connected to the electronic control unit (50), and the electronic control unit (50) is connected to the internal connector (20).

Thereby, the first seal member (70) provides a sealing between the electronic control unit (50) and the casing (10).

In this connector connection structure, preferably, the external connector (30) is provided with a tubular portion (37) having a part opposing the opening (16) in a state where the electronic control unit (50) is connected to the internal connector (20) and the external connector (30), and the first seal member (70) is configured to be selectively in a first state where the first seal member (70) abuts against the inner peripheral surface of the opening (16) to provide a seal between the casing (10) and the electronic control unit (50) when the electronic control unit (50) is connected to the internal connector (20) and the electronic control unit (50) is not connected to the external connector (30), and a second state where the first seal member (70) abuts against the inner peripheral surface of the tubular portion (37) to provide a seal between the electronic control unit (50) and the external connector (30) when the electronic control unit (50) is connected to the external connector (30).

Thereby, the first seal member (70) is in the first state to provide a seal between the casing (10) and the electronic control unit (50) when the electronic control unit (50) is not connected to the external connector (30), and in the second state to provide a seal between the electronic control unit (50) and the external connector (30) when the electronic control unit (50) is connected to the external connector (30).

In this connector connection structure, preferably, the first seal member (70) is made of rubber, and is provided with a base part (72) fixed to an outer peripheral portion of the main part (54), and a lip portion (74) including a radially extending free end (74A) so that the free end (74A) is configured to abut against the inner peripheral surface (16A) of the opening (16) and the inner peripheral surface (37A) of the tubular portion (37) under an elastic deformation of the lip portion (74).

Thereby, the first seal member (70) automatically takes the first state and the second state owing to the elastic deformation of the lip portion (74), and provides a favorable sealing in either state.

Preferably, this connector connection structure further includes a second seal member (42) attached to an outer periphery of the external connector (30) to provide a seal between the electronic control unit (50) and the casing (10) at the opening (16).

Thereby, when the external connector (30) is connected to the electronic control unit (50), the second seal member (42) prevents foreign matter from entering the casing (10).

In this connector connection structure, preferably, the electronic control unit (50) and the external connector (30) are provided with engagement portions (40, 60) configured to engage with each other, the engagement portions (40, 60) engaging with each other when connecting the electronic control unit (50) to the external connector (20), and maintaining a mutually engaged state to maintain the electronic control unit (50) and the external connector (30) connected to each other when the electronic control unit (50) is disconnected from the external connector (20).

Thus, the electronic control unit (50) can be removed from the internal connector (20) with the electronic control unit (50) remaining to be connected to the external connector (30) so that the work efficiency in removing the electronic control unit (50) can be improved.

In this connector connection structure, preferably, the first seal member (70) is provided with a base part (82) fixed to an outer periphery of the main part (54), and a flange portion (84) including a first sealing surface (84A) that contacts an outer surface (14A) of a part of the casing (10) surrounding the opening (16) and a second sealing surface (84B) that contacts a flange (33) provided on the external connector (30).

Thereby, the opening (16) is closed by the first seal member (70) and a seal is provided between the casing (10) and the external connector (30).

In this connector connection structure, preferably, the internal connector (20) is mounted to the casing (10) so as to be displaceable in a direction orthogonal to a connection direction to the electronic control unit (50).

Thereby, an uneven load is prevented from acting on the first seal member (70) so that the sealing performance of the first seal member (70) is favorably ensured.

Effect of the Invention

According to the connector connection structure of the present invention, the electronic control unit can be replaced with a favorable work efficiency, and foreign matter can be prevented from entering the casing during maintenance work.

DETAILED DESCRIPTION OF THE PREFERRED EMBODIMENT(S)

Figure 1:
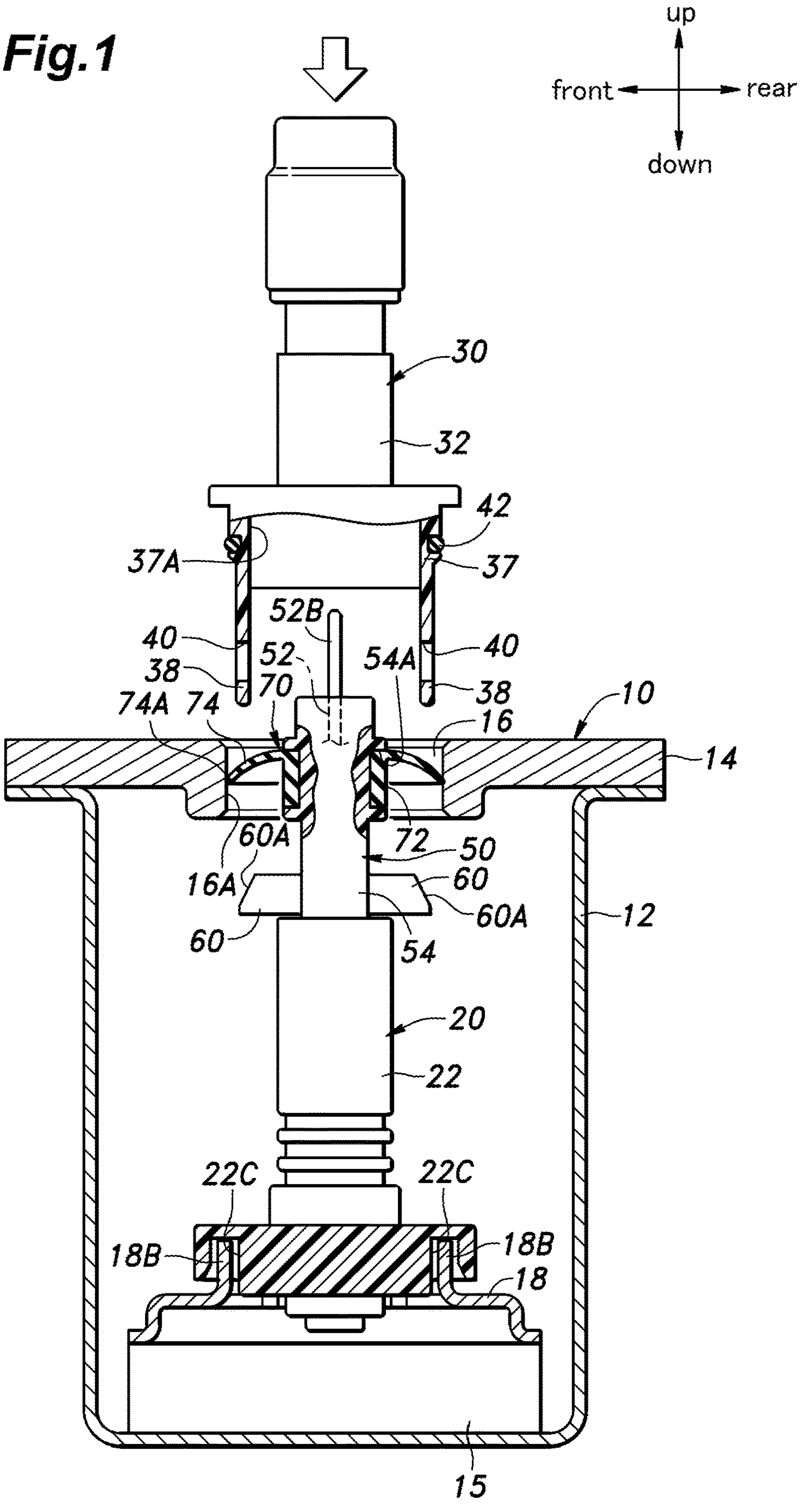
FIG. 1 is a view of a connector connecting structure according to an embodiment of the present invention partly in section with an external connector not connected.

A connector connection structure according to an embodiment of the present invention will be described in the following with reference to FIGS. 1 to 5.

The connector connection structure of the present embodiment includes a casing 10, an internal connector 20 positioned inside the casing 10, an external connector 30 positioned outside the casing 10, and an electronic control unit 50 electrically connected to both the internal connector 20 and the external connector 30.

The casing 10 has a sealed structure, and includes a box-shaped casing main body 12 having an open upper end, and a flat cover plate 14 attached to the upper end of the casing main body 12 so as to close the upper opening of the casing main body 12. A control object device 15 to be controlled by the electronic control unit 50 is placed at the bottom of the casing 10. The cover plate 14 is formed with an opening 16 for placing the electronic control unit 50 into the casing 10.

Figure 4:
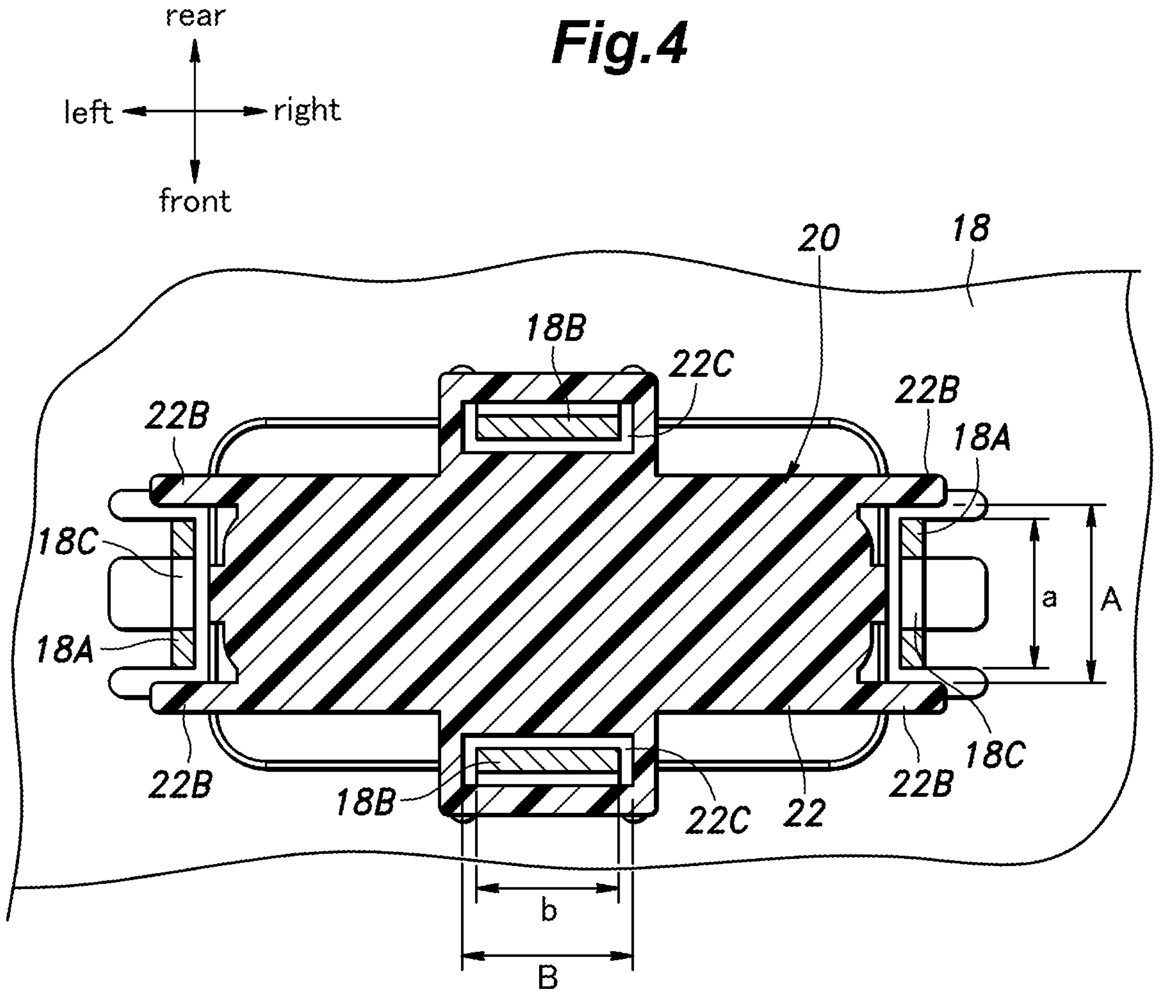
FIG. 4 is a sectional plan view of the mounting structure of the internal connector of the connector connecting structure of the present embodiment.

A connector mounting plate 18 is attached to the upper end of the control object device 15. As shown in FIG. 4, the connector mounting plate 18 is provided with a pair of upright pieces 18A located on either lateral side thereof and another pair of upright pieces 18B on either longitudinal end thereof. Each upright piece 18A is provided with an engagement hole 18C which is engaged by an engagement protrusion 22A (see FIG. 5) formed on the corresponding side of an outer wall of a housing 22 of the internal connector 20. Owing to this engagement, the internal connector 20 is mounted to the connector mounting plate 18 so as to be restricted from being displaced in the vertical direction.

As shown in FIG. 4, each lateral side of the outer wall of the housing 22 is provided with a pair of protruding walls 22B spaced from each other by a distance A in the longitudinal direction so as to oppose the upright piece 18A from the front and back. The longitudinal outer dimension a of the upright piece 18A is smaller than the distance A (or the inner dimension of the protruding walls 22B). As a result, the internal connector 20 can be displaced with respect to the connector mounting plate 18, or in other words, with respect to the casing 10 in the fore and aft (longitudinal) direction by the dimensional difference between the distance A and the outer dimension a.

As shown in FIG. 4, each longitudinal end of the housing 22 is formed with a cavity 22C having a downwardly facing opening with which the upright piece 18B engages. The inner dimension B of the cavity 22C along the lateral direction is larger than the outer dimension b of the upright piece 18B along the lateral direction. As a result, the internal connector 20 can be displaced with respect to the connector mounting plate 18, or in other words, with respect to the casing 10 along the lateral direction by the dimensional difference between the inner dimension B and the outer dimension b.

In this way, the internal connector 20 is mounted to the casing 10 via the control object device 15 and the connector mounting plate 18 so as to be displaceable in the longitudinal direction and the lateral direction which are orthogonal to the connecting direction (vertical direction) to the electronic control unit 50.

Figure 2:
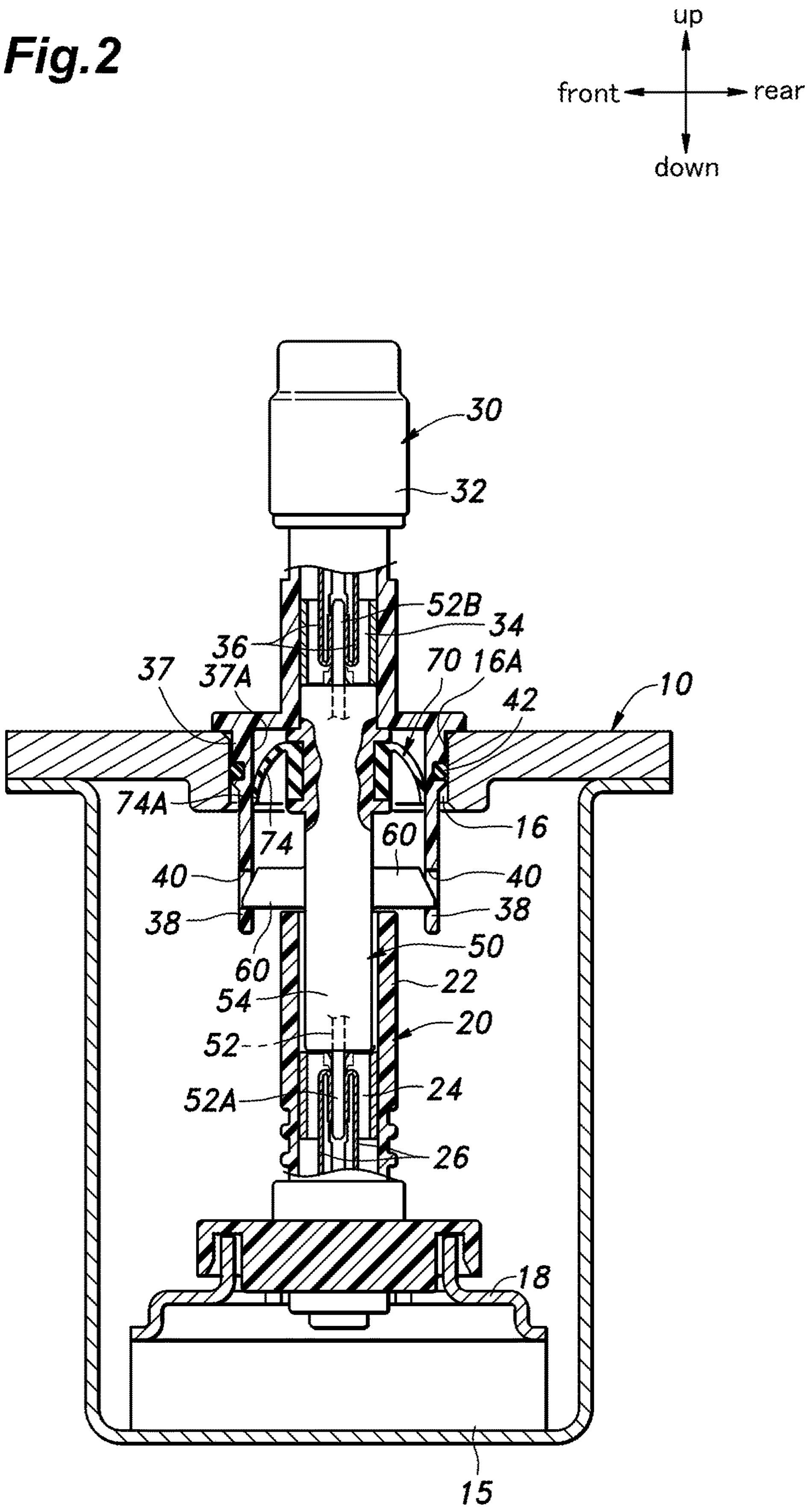
FIG. 2 is a view of the connector connecting structure of the present embodiment partly in section with the external connector connected.

As shown in FIG. 2, the internal connector 20 is a double-sided card edge connector including a plurality of female terminals 26 placed in a terminal chamber 24 formed in the housing 22 so as to have an open upper end.

As shown in FIG. 2, the external connector 30 is a double-sided card edge connector including a plurality of female terminals 36 placed in a terminal chamber 34 formed in a housing 32 of the external connector 30 so as to have an open lower end.

The electronic control unit 50 includes a main part 54 having a rectangular shape and containing a main part of a printed circuit board 52, and CPU and other electronic components (not shown in the drawings) mounted on the main part of the printed circuit board 52, all molded in electrically insulating resin, a first conductive connection portion 56 (terminals) (see FIG. 5) formed on both sides of a first card edge portion 52A extending downward from the lower edge of the main part 54 of the printed circuit board 52, and a second conductive connection portion 58 (terminals) (see FIG. 5) formed on both sides of a second card edge portion 52B extending upward from the upper edge of the main part 54 of the printed circuit board 52. The first conductive connection portion 56 is configured to be electrically connected to the female terminals 26 of the internal connector 20, and the second conductive connection portion 58 is configured to be electrically connected to the female terminals 36 of the external connector 30.

As shown in FIG. 1, a first seal member 70 is attached to the outer periphery of the main part 54 of the electronic control unit 50 which opposes the periphery of the opening 16 in the connected state of the electronic control unit 50 to the internal connector 20 in which the first conductive connection portion 56 contacts the female terminals 26. The first seal member 70 is made of rubber, and includes a base part 72 fixed to the outer periphery of the main part 54 by being fitted into a peripheral groove 54A formed in the outer periphery of the main part 54 and a thin-walled lip portion 74 provided with a free end 74A extending radially outward from the main part 54 like an umbrella.

Figure 5:
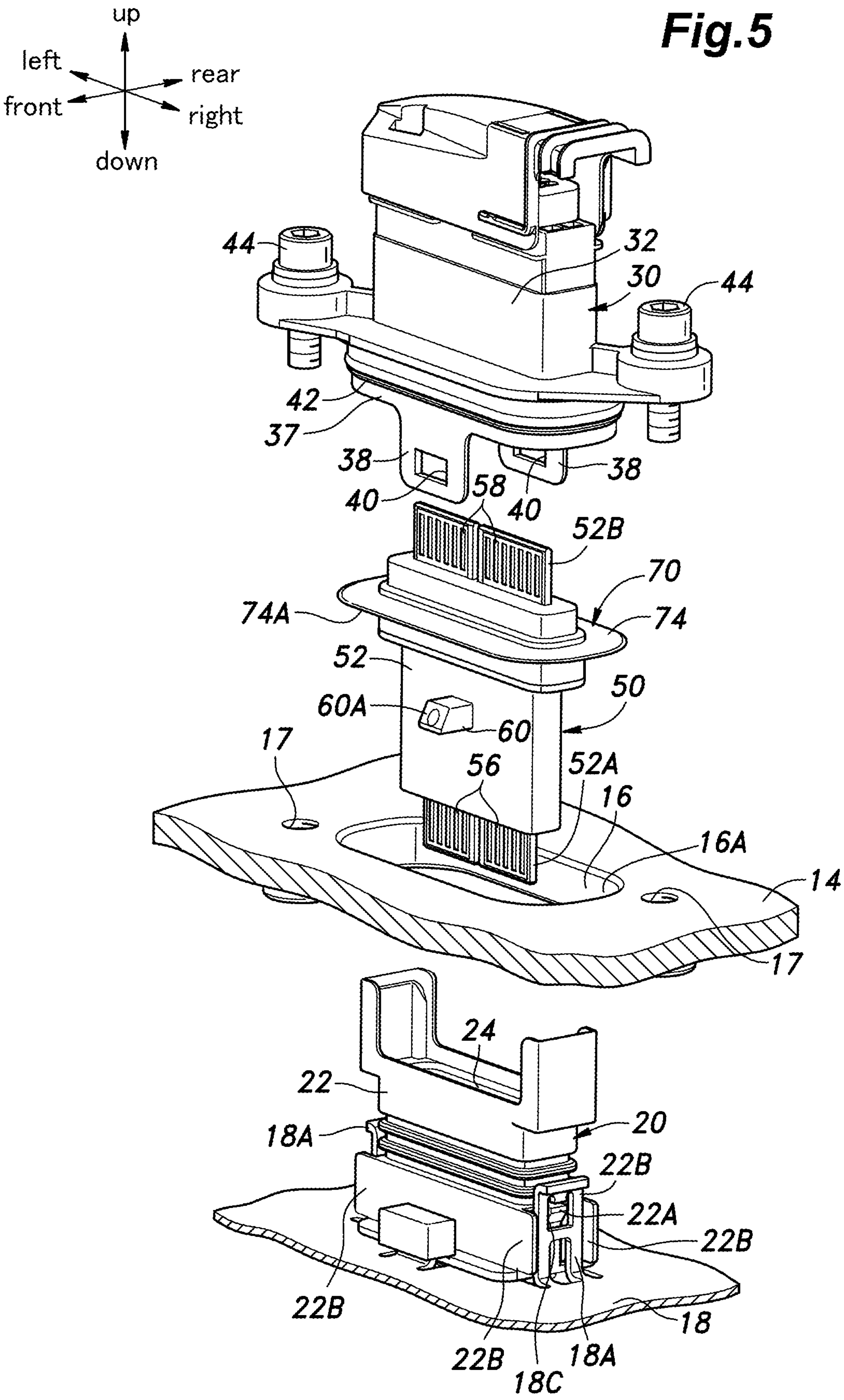
FIG. 5 is an exploded perspective view of the connector connecting structure of the present embodiment.

As shown in FIG. 5, the opening 16 is similar in shape to the outer profile of the part of the main part 54 located in the opening 16 in plan view, and has an oval shape elongated in the lateral direction. Similarly, the first seal member 70 is similar in shape to the outer profile of the part of the main part 54 located at the opening 16 in plan view, and has an oval annular shape extending along the entire circumference of this part of the main part 54.

As shown in FIG. 1, the first seal member 70 is configured to be in a first state where the free end 74A of the lip portion 74 abuts against (contacts) the inner peripheral surface of the opening 16 so as to close the opening 16 and provides a seal between the casing 10 and the electronic control unit 50 when the electronic control unit 50 is connected to the internal connector 20 and the external connector 30 is not connected to the electronic control unit 50.

As a result, foreign matter is prevented from entering the casing 10 through the opening 16 in a state where the external connector 30 is not connected to the electronic control unit 50.

Since the internal connector 20 can be displaced relative to the casing 10 in the longitudinal direction and the lateral direction orthogonal to the connecting direction to the electronic control unit 50, the internal connector 20 can be displaced with respect to the casing 10 so that the free end 74A of the lip portion 74 can uniformly abut on the inner peripheral surface of the opening 16 over the entire circumference. As a result, an uneven load is prevented from acting on the first seal member 70 so that the sealing between the casing 10 and the electronic control unit 50 can be appropriately provided over the entire periphery of the electronic control unit 50.

A part of the main part 54 of the electronic control unit 50 located below the part where the first seal member 70 is fitted (toward the side of the first conductive connecting portion 56) is provided with a pair of protrusions 60 projecting from the front and rear surfaces thereof, respectively. The tip end surface 60A of each protrusion 60 is slanted outward toward the lower side thereof.

As shown in FIG. 2, the part of the housing 32 opposing the opening 16 in a state where the external connector 30 is connected to the electronic control unit 50 is provided with a tubular portion 37 which is similar in shape to the opening 16 in plan view. The outer periphery of the tubular portion 37 is fitted with a second seal member 42. The second seal member 42 may be an O-ring made of rubber or the like, and a seal is provided between the electronic control unit 50 and the casing 10 at the opening 16 by abutting (contacting) the inner peripheral surface of the opening 16 in a state where the external connector 30 is connected to the electronic control unit 50.

As a result, as shown in FIG. 2, foreign matter is prevented from entering the casing 10 from the opening 16 in a state where the electronic control unit 50 is connected to the internal connector 20 and the external connector 30 is connected to the electronic control unit 50.

The external connector 30 is provided with a pair of depending pieces 38 extending downward from the front side and rear side of the lower end of the tubular portion 37, respectively. Each depending piece 38 is configured to contact the lip portion 74 of the first seal member 70, and move past the lip portion 74 by resiliently deforming the lip portion 74 when the external connector 30 is inserted into the opening 16 in order to connect the external connector 30 to the electronic control unit 50 from the upper side (outer side) of the housing 32.

Figure 3:
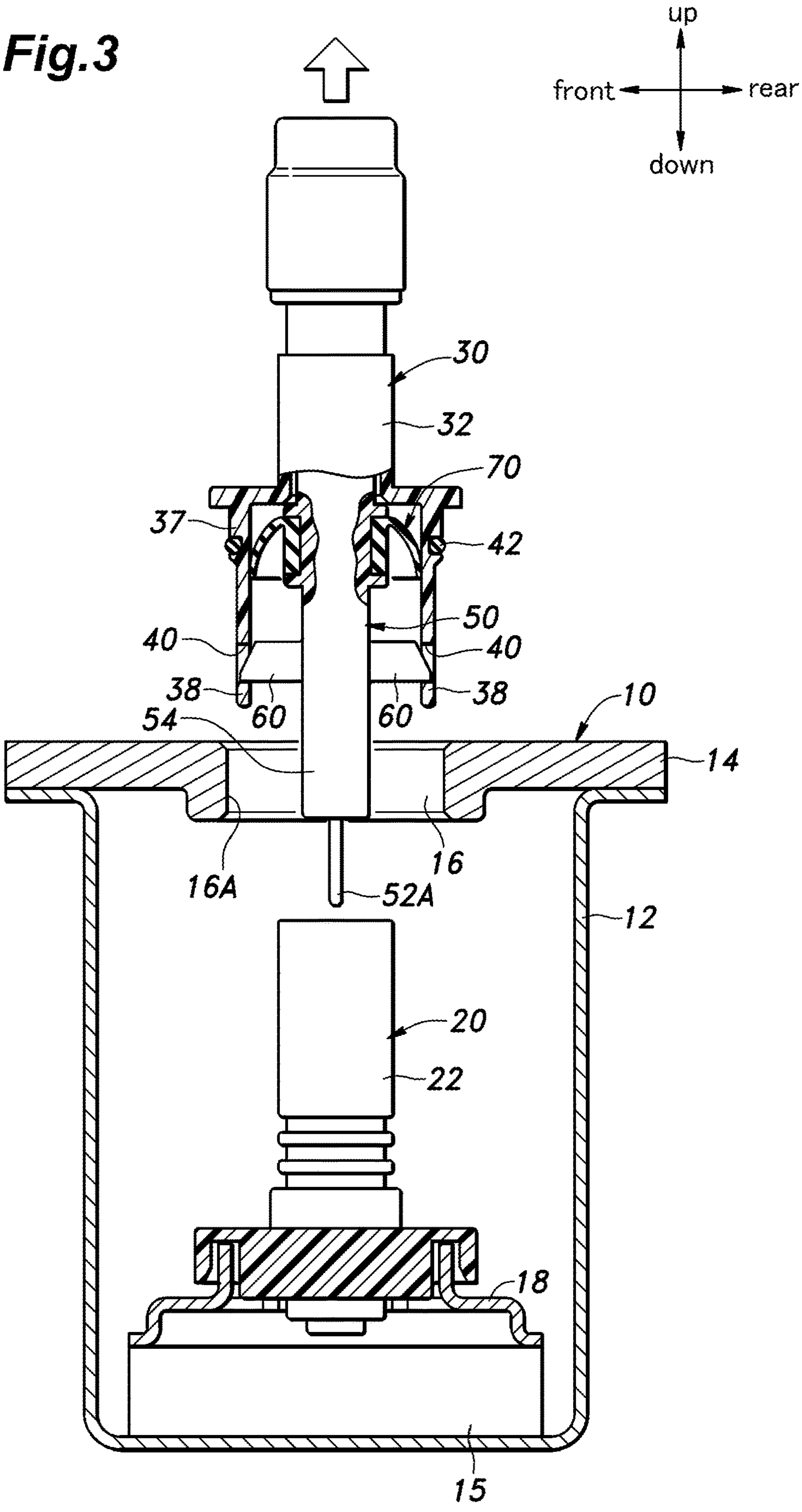
FIG. 3 is a view of the connector connecting structure of the present embodiment partly in section with the external connector removed.

As a result, as shown in FIGS. 2 and 3, when the external connector 30 is connected to the electronic control unit 50, the first seal member 70 takes a second state in which the first seal member 70 is in contact with the inner peripheral surface 37A of the tubular portion 37. In the second state, a seal is provided between the external connector 30 and the electronic control unit 50 so that foreign matter is prevented from entering the electric connection portion between the external connector 30 and the electronic control unit 50.

As shown in FIG. 2, in a completely connected state in which the electronic control unit 50 is connected to the internal connector 20 and the external connector 30 is connected to the electronic control unit 50, the external connector 30 can be fixed to the casing 10 by bolts 44 engaged by the external connector 30 being screwed into screw holes 17 formed in the cover plate 14.

An engagement hole 40 is formed in each depending piece 38 adjacent to the tip end thereof. When the external connector 30 is connected to the electronic control unit 50, the protrusions 60 enter the corresponding engagement holes 40 so that the depending pieces 38 are engaged by the protrusions 60. The engagement holes 40 and the protrusions 60 are kept engaged with each other when the electronic control unit 50 is removed from the internal connector 20 to maintain the coupling between the electronic control unit 50 and the external connector 30.

When removing the electronic control unit 50 from the internal connector 20, as shown in FIG. 3, the external connector 30 is lifted from the casing 10 so that the electronic control unit 50 is withdrawn from the casing 10 with the external connector 30 kept connected thereto.

As a result, when the electronic control unit 50 is removed from the internal connector 20, the electronic control unit 50 does not remain in the casing 10 kept connected to the internal connector 20. Thereby, the maintenance work such as replacing the electronic control unit 50 is facilitated.

Figure 6:
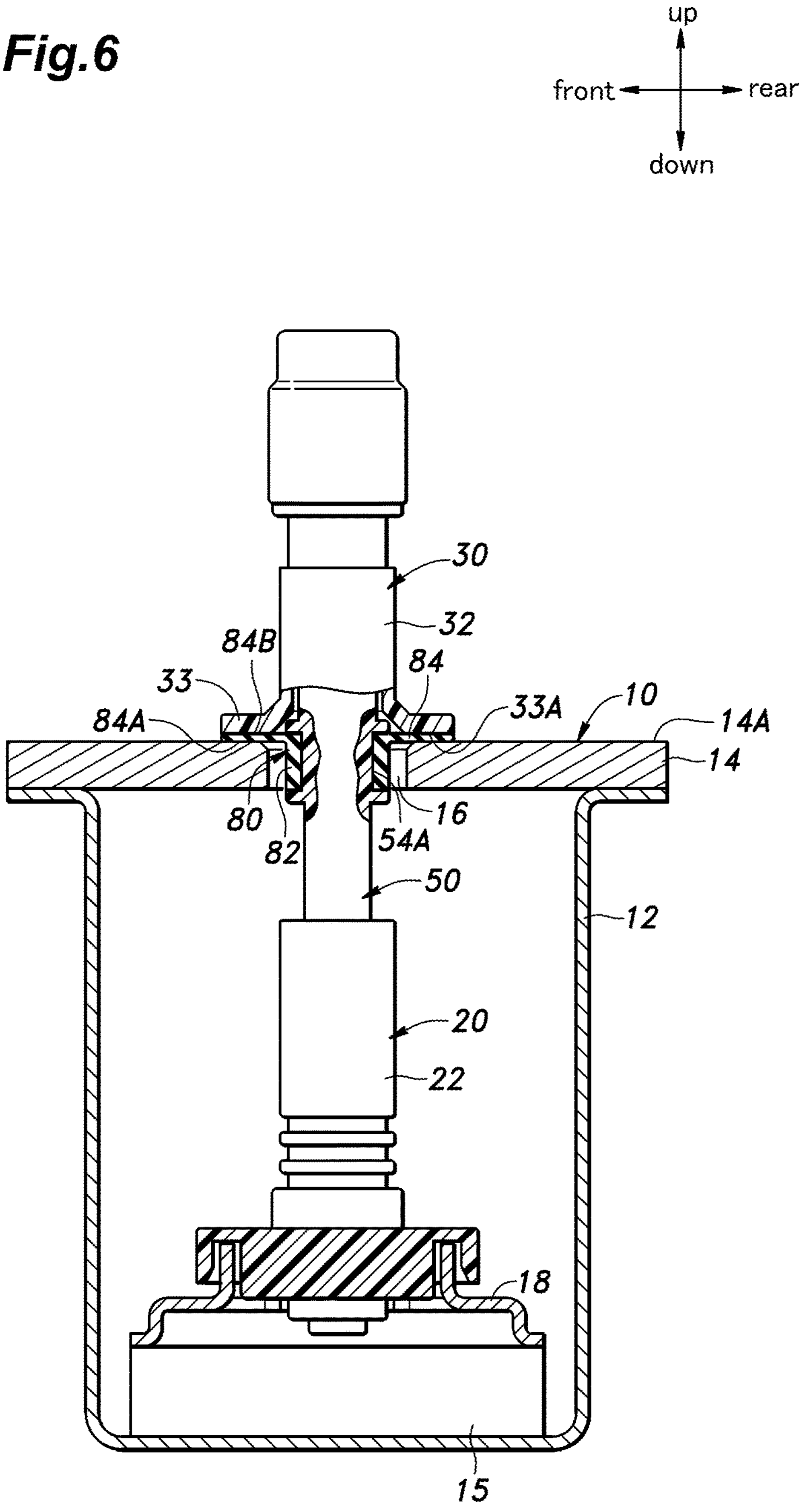
FIG. 6 is a view of a connector connecting structure according to another embodiment of the present invention partly in section with an external connector connected.

Next, a connector connection structure according to another embodiment of the present invention will be described in the following with reference to FIG. 6. In FIG. 6, the parts corresponding to those in FIGS. 1 to 5 are denoted by like reference numerals as those given in FIGS. 1 to 5 without repeating the description of such parts.

The electronic control unit 50 is fitted with a first seal member 80 which differs from the first seal member 70 of the foregoing embodiment in shape or the like. The first seal member 80 is made of rubber, and includes a base part 82 fixed to the outer periphery of the main part 54 by being fitted into a peripheral groove 54A formed in the outer periphery of the main part 54 and a planar flange portion 84 extending radially outward from the base part 82.

In a state where the electronic control unit 50 is not connected to the external connector 30, the flange portion 84 closes the opening 16 by a first sealing surface 84A formed by the lower surface of the flange portion 84 contacting the upper surface 14A of the cover plate 14.

As a result, foreign matter is prevented from entering the casing 10 through the opening 16 in a state where the external connector 30 is not connected to the electronic control unit 50.

In a state where the electronic control unit 50 is connected to the external connector 30, the flange portion 84 provides a seal between the external connector 30 and the electronic control unit 50 by a second sealing surface 84B formed by the upper surface of the flange portion 84 contacting the lower surface of a flange portion 33 formed at the lower end of the housing 32 of the external connector 30.

As a result, foreign matter is prevented from entering the casing 10 through the opening 16 even in a state where the external connector 30 is connected to the electronic control unit 50.

In this embodiment, the second seal member 42 can be omitted.

The present invention has been described above in terms of preferred embodiments thereof, but as can be easily appreciated by those skilled in the art, is not limited to such embodiments and may be modified in various ways without departing from the scope of the present invention. It is not essential to provide a structure for pulling up the electronic control unit 50 by engaging the engagement holes 40 of the external connector 30 with the protrusions 60 of the electronic control unit 50, and the depending pieces 38 provided with the engagement holes 40 and the corresponding protrusion 60 may be omitted as is the case with the embodiment shown in FIG. 6. In addition, not all of the components shown in the above embodiments are indispensable, and they can be appropriately selected without deviating from the gist of the present invention.

LIST OF REFERENCE NUMERALS

10: casing
12: casing main body
14: cover plate
14A: upper surface
15: control object device
16: opening
17: screw hole
18: connector mounting plate
18A: upright piece
18B: upright piece
18C: engagement hole
20: internal connector
22: housing
22A: engagement protrusion
22B: protruding wall
22C: cavity
24: terminal chamber
26: female terminal
30: external connector
32: housing
33: flange
33A: bottom surface
34: terminal chamber
36: female terminal
37: tubular portion
37A: inner peripheral surface
38: depending piece
40: engagement hole
42: second seal member
44: bolt
50: electronic control unit
52: printed circuit board
52A: first card edge portion
52B: second card edge portion
54: main part
54A: peripheral groove
56: first conductive connection portion
58: second conductive connection portion
60: protrusion
60A: tip surface
70: first seal member
72: base part
74: lip portion
74A: free end
80: first seal member
82: base part
84: flange portion
84A: first sealing surface
84B: second sealing surface

The invention claimed is:

1. A connector connection structure, including:

an internal connector positioned inside a casing, an external connector positioned outside the casing, and an electronic control unit electrically connected between the external connector and the internal connector, wherein the electronic control unit includes a main part that opposes an opening formed in the casing when the internal connector is connected thereto, and a first conductive connection portion and a second conductive connection portion provided on either end of the main part and configured to be connected to the internal connector and the external connector, respectively, and a first seal member is provided on an outer periphery of the main part, the first seal member closing the opening when the external connector is not connected to the electronic control unit, and the internal connector is connected to the electronic control unit wherein the external connector is provided with a tubular portion having a part opposing the opening in a state where the electronic control unit is connected to the internal connector and the external connector, and the first seal member is configured to be selectively in a first state where the first seal member abuts against the inner peripheral surface of the opening to provide a seal between the casing and the electronic control unit when the electronic control unit is connected to the internal connector and the electronic control unit is not connected to the external connector, and a second state where the first seal member abuts against the inner peripheral surface of the tubular portion to provide a seal between the electronic control unit and the external connector when the electronic control unit is connected to the external connector.

2. The connector connection structure according to claim 1, wherein the first seal member is configured to abut against an inner peripheral surface of the opening so as to provide a seal between the casing and the electronic control unit when the external connector is not connected to the electronic control unit, and the electronic control unit is connected to the internal connector.

3. The connector connection structure according to claim 1, wherein the first seal member is made of rubber, and is provided with a base part fixed to an outer peripheral portion of the main part, and a lip portion including a radially extending free end so that the free end is configured to abut against the inner peripheral surface of the opening and the inner peripheral surface of the tubular portion under an elastic deformation of the lip portion.

4. The connector connection structure according to claim 1, further including a second seal member attached to an outer periphery of the external connector to provide a seal between the electronic control unit and the casing at the opening.

5. The connector connection structure according to claim 1, wherein the internal connector is mounted to the casing so as to be displaceable in a direction orthogonal to a connection direction to the electronic control unit.

6. A connector connection structure, including:

an internal connector positioned inside a casing, an external connector positioned outside the casing, and an electronic control unit electrically connected between the external connector and the internal connector, wherein the electronic control unit includes a main part that opposes an opening formed in the casing when the internal connector is connected thereto, and a first conductive connection portion and a second conductive connection portion provided on either end of the main part and configured to be connected to the internal connector and the external connector, respectively, and a first seal member is provided on an outer periphery of the main part, the first seal member closing the opening when the external connector is not connected to the electronic control unit, and the internal connector is connected to the electronic control unit, wherein the electronic control unit and the external connector are provided with engagement portions configured to engage with each other, the engagement portions engaging with each other when connecting the electronic control unit to the external connector, and maintaining a mutually engaged state to maintain the electronic control unit and the external connector connected to each other when the electronic control unit is disconnected from the internal external connector.

7. A connector connection structure, including:

an internal connector positioned inside a casing, an external connector positioned outside the casing, and an electronic control unit electrically connected between the external connector and the internal connector, wherein the electronic control unit includes a main part that opposes an opening formed in the casing when the internal connector is connected thereto, and a first conductive connection portion and a second conductive connection portion provided on either end of the main part and configured to be connected to the internal connector and the external connector, respectively, and a first seal member is provided on an outer periphery of the main part, the first seal member closing the opening when the external connector is not connected to the electronic control unit, and the internal connector is connected to the electronic control unit, wherein the first seal member is provided with a base part fixed to an outer periphery of the main part, and a flange portion including a first sealing surface that contacts an outer surface of a part of the casing surrounding the opening and a second sealing surface that contacts a flange provided on the external connector.

* * * * *